United States Patent
Li et al.

(10) Patent No.: US 8,349,517 B2
(45) Date of Patent: Jan. 8, 2013

(54) METHOD OF COATING A SURFACE OF A FUEL CELL PLATE

(75) Inventors: Wen Li, El Segundo, CA (US); Ping Liu, Irvine, CA (US); Jennifer J. Zinck, Calabasas, CA (US); Tina T. Salguero, Encino, CA (US); Richard H. Blunk, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 903 days.

(21) Appl. No.: 12/429,161

(22) Filed: Apr. 23, 2009

(65) Prior Publication Data
US 2010/0273094 A1 Oct. 28, 2010

(51) Int. Cl.
*H01M 4/64* (2006.01)
(52) U.S. Cl. ........ 429/518; 429/456; 429/457; 429/517; 429/519; 429/520; 429/521; 429/522; 429/535; 427/115; 427/343; 252/519.33; 252/519.34
(58) Field of Classification Search .................. 419/456, 419/457, 517–522, 535; 427/115, 343
See application file for complete search history.

(56) References Cited

U.S. PATENT DOCUMENTS

| | | | |
|---|---|---|---|
| 7,977,012 B2 * | 7/2011 | Li et al. .................... | 429/518 |
| 2006/0194095 A1 | 8/2006 | Vyas et al. | |
| 2006/0216571 A1 | 9/2006 | Vyas et al. | |
| 2007/0003813 A1 | 1/2007 | Vyas et al. | |
| 2007/0031721 A1 | 2/2007 | Winter et al. | |
| 2007/0117003 A1 | 5/2007 | Abd Elhamid et al. | |
| 2007/0178357 A1 | 8/2007 | Vyas et al. | |
| 2008/0076004 A1 | 3/2008 | Rodak et al. | |
| 2008/0095928 A1 * | 4/2008 | Salguero et al. .......... | 427/115 |
| 2008/0124587 A1 | 5/2008 | Kisailus et al. | |

* cited by examiner

*Primary Examiner* — Steven Loke
*Assistant Examiner* — Cuong Nguyen
(74) *Attorney, Agent, or Firm* — Dierker & Associates, P.C.

(57) ABSTRACT

A method of coating a surface of a fuel cell plate is disclosed herein, and involves forming a sol gel mixture by mixing a weak acid and a composition including at least two metal oxide precursors. One of the metal oxide precursors is configured to be hydrolyzed by the weak acid to form a mixed metal oxide framework with an other of the metal oxide precursors having at least one organic functional group that is not hydrolyzed by the weak acid. The mixture is applied to the surface, and is condensed by exposure to air at least one predetermined temperature and for a predetermined time. The sol gel mixture is immersed in water at a predetermined temperature and for a predetermined time to form a porous, hydrophilic, and conductive film on the surface.

10 Claims, 3 Drawing Sheets

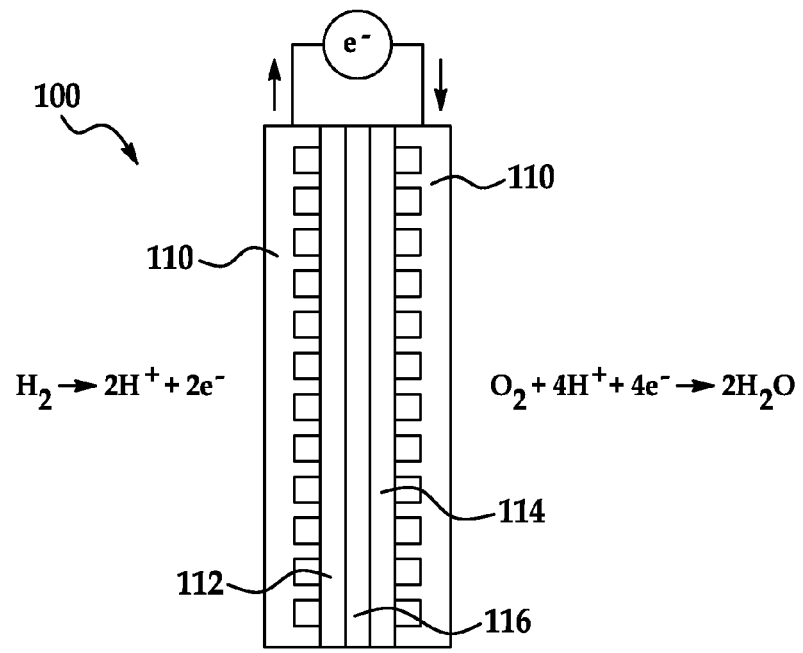
FIG. 1
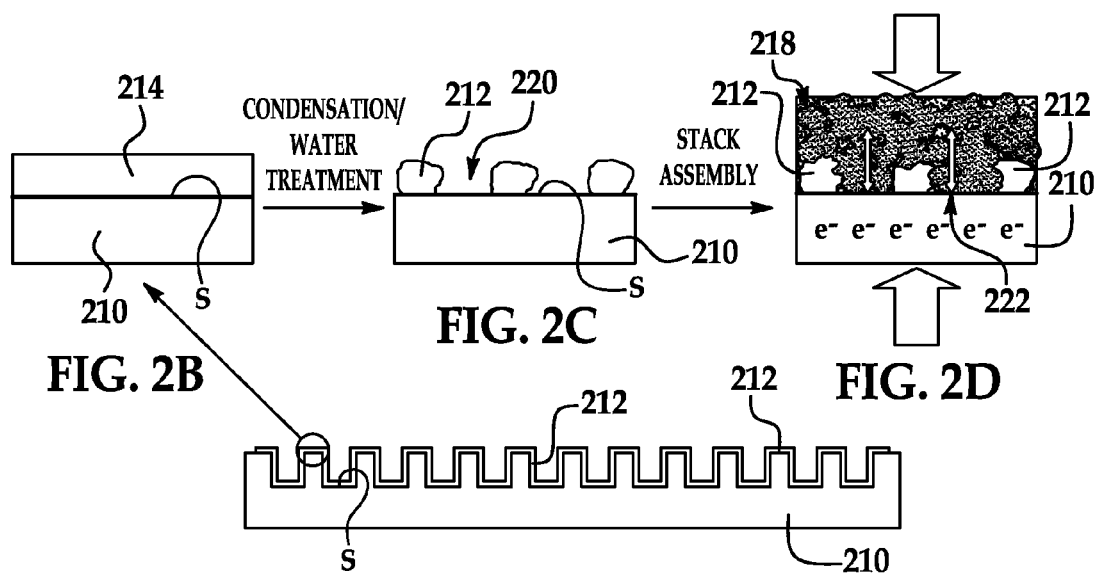
FIG. 2A
FIG. 2B
FIG. 2C
FIG. 2D

METHOD OF COATING A SURFACE OF A FUEL CELL PLATE

TECHNICAL FIELD

The present disclosure relates generally to fuel cells, and more particularly to a method of coating a surface of a fuel cell plate.

BACKGROUND

A bipolar plate is one component in a PEM (proton electrolyte membrane) fuel cell. The bipolar plate occupies about 80% of the total fuel cell weight, and constitutes about 45% of the stack cost. The bipolar plate is generally configured to redistribute reactants uniformly over the active areas, remove heat from active areas, carry current from one cell to another, and prevent leakage of reactants and coolants.

SUMMARY

A method of coating a surface of a fuel cell plate is disclosed herein. The method includes forming a sol gel mixture by mixing a weak acid and a composition including at least two metal oxide precursors. One of the metal oxide precursors is configured to be hydrolyzed by the weak acid to form a mixed metal oxide framework with an other of the metal oxide precursors having at least one organic functional group that is not hydrolyzed by the weak acid. The method further includes applying the sol gel mixture to the surface of the fuel cell plate, condensing the sol gel mixture by exposure to air at least one predetermined temperature for a predetermined time; and immersing the sol gel mixture in water at a predetermined temperature for a predetermined time to form a porous, hydrophilic, and conductive film on the surface of the fuel cell plate, the weak acid thereby causing the one of the metal oxide precursors to hydrolyze and form the mixed metal oxide framework.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a schematic cross-sectional view of an embodiment of a PEM fuel cell;

FIGS. 2A through 2D are schematic diagrams which together depict an embodiment of the coated bipolar plate (FIG. 2A), and exploded views of a method for making and stacking the same (FIGS. 2B-2D);

FIG. 4A illustrates the results of coatings including $TiO_2$, Ti/Si (1:4), and $SiO_2$, and where FIG. 4B illustrates the results of a coating including Ti/Si (1:2)

DETAILED DESCRIPTION

Figure 3:
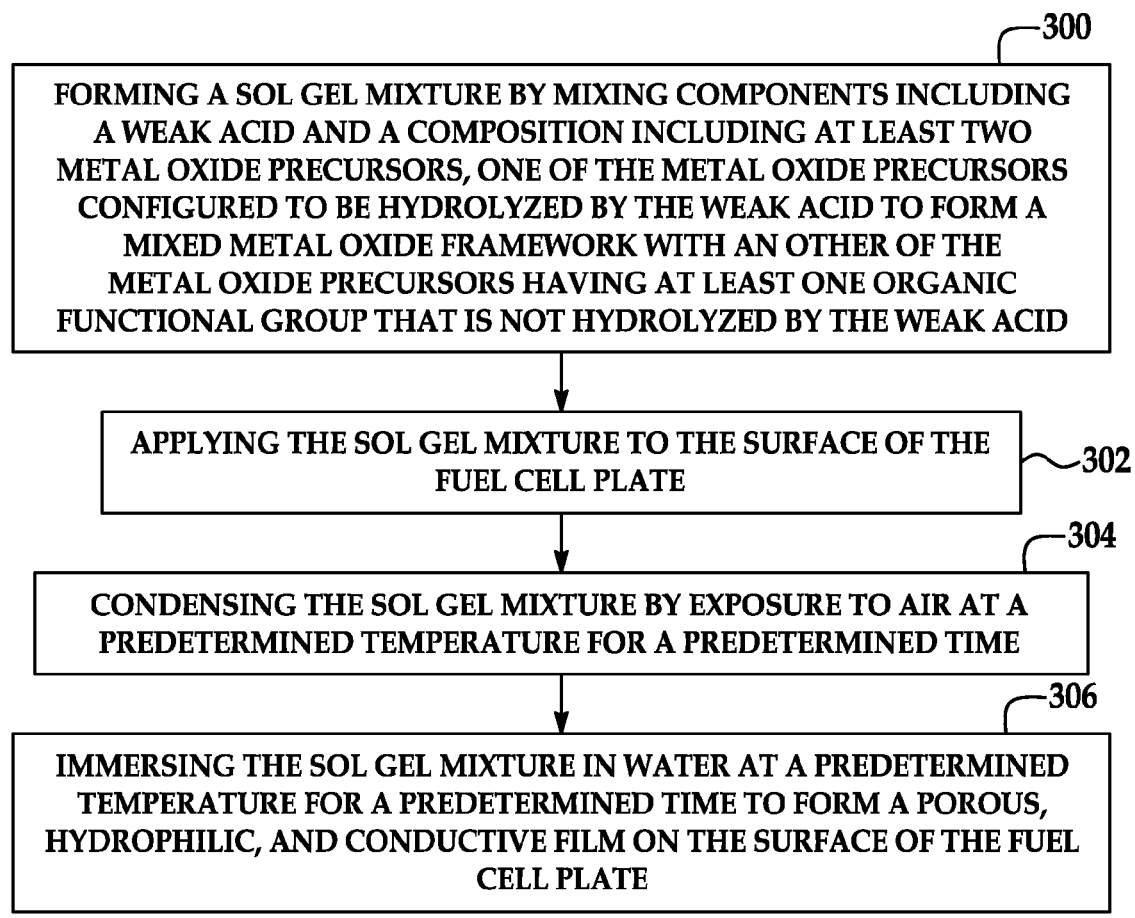
FIG. 3 is a flow diagram illustrating an embodiment of a method for forming an embodiment of a coating on a fuel cell plate.

Embodiments of the metallic bipolar plate coating disclosed herein are conductive, and also advantageously have highly stable hydrophilicity. As such, beyond the traditional functions of bipolar plates, such as distributing reactants uniformly over the active areas, removing heat from the active areas, carrying current from cell to cell, and preventing leakage of reactants and coolant, the coating disclosed herein also improves water management for current PEM fuel cell systems. This, in turn, improves the performance and longevity of the fuel cell in which it is incorporated.

It is believed that the coating disclosed herein provides at least one notable advantage, namely robust hydrophilicity in a fuel cell environment due to improved chemical robustness. The improved chemical robustness is due, at least in part, to the mixed oxide composition, as well as the process of making the coating. As previously mentioned, the hydrophilicity contributes to water management in the PEM fuel cell system. For example, the coating provides a certain level of relative humidity in the fuel cell which improves proton conductivity under various fuel cell conditions. The coating also provides paths to quickly remove water, thereby reducing or preventing flooding at low current density conditions. Furthermore, the conductivity of the coating prevents potential cell voltage drop, which may otherwise result when a coating layer is present on the bipolar plate.

Referring now to FIG. 1, a typical PEM fuel cell 100 is depicted. The fuel cell 100 includes an anode electrode layer 112, a proton exchange membrane 116, and a cathode electrode layer 114, all sandwiched between two bipolar plates 110.

In the fuel cell 100 disclosed herein, a coating (not shown in FIG. 1) is established on the bipolar plates 110. This coating is a mixed oxide layer created by a co-gel synthesis approach employing a weak acid for hydrolysis of alkoxide precursors. This allows for formation of a mixed oxide framework at low temperature in situ on the surface of the bipolar metallic plates 110. As previously mentioned and as discussed further hereinbelow, this mixed oxide framework provides hydrophilicity and stability to the fuel cell 100.

In an embodiment, the coating is made up of a mixture of titanium oxide and silicon oxide, which provides stable hydrophilicity in a fuel cell environment as compared to silicon oxide alone. In another embodiment, special functional groups are included in some of the metal alkoxide precursors, and these functional groups are believed to contribute to improved particle adhesion of the coating to the surface of the bipolar metallic plates 110. Furthermore, electron conductive paths are created by using a thin coating layer and an activation process which results in a morphology that allows the gas diffusion media to penetrate and contact the bipolar plates 110.

FIGS. 2A through 2D and 3 illustrate an embodiment of the method for forming the coating. Generally, as shown in FIG. 3, the method includes forming a sol gel mixture by mixing a weak acid and a composition including at least two metal oxide precursors, one of the metal oxide precursors configured to be hydrolyzed by the weak acid to form a mixed metal oxide framework with another of the metal oxide precursors having at least one organic functional group that is not (or cannot be) hydrolyzed by the weak acid, as shown at reference numeral 300. The method then includes applying the sol gel mixture to the surface of the fuel cell bipolar plate, as shown at reference numeral 302, and then condensing the sol gel mixture by exposing the applied mixture to air at one or more predetermined temperatures for a predetermined time, as shown at reference numeral 304. The condensed sol gel mixture is then immersed in water at a predetermined temperature for a predetermined time to form a porous, hydrophilic, and conductive film on the surface of the fuel cell bipolar plate, as shown at reference numeral 306. Before, during or after the immersion step and as previously mentioned, the weak acid causes the one metal oxide precursor to hydrolyze and form the mixed metal oxide framework with the other metal oxide precursor.

FIGS. 2A through 2C illustrate the method depicted in FIG. 3, and additional description is provided in reference to these Figures. FIG. 2A illustrates a bipolar plate 210 for a PEM fuel cell (e.g., 100, as shown in FIG. 1) that is coated with an embodiment of the conductive, hydrophilic layer/coating 212 disclosed herein. While the coating 212 is shown as being substantially continuous along the surface S of the bipolar plate 210, it is to be understood that the coating 212 is porous and thus exposes, at certain areas, portions of the conductive bipolar plate surface S (or a conductive coating (not shown) established thereon). More specifically, during the condensation/water treatment process (described further hereinbelow), small porous particles 212 making up the coating 212 are formed on the surface S (as shown in FIG. 2C), and the pores or spaces between the porous particles 212 provide a contact surface for the formation of electron conductive paths (as shown in FIGS. 2D) during stack assembly. As such, while the coating 212 may be uniformly established on the surface S, such coating 212 includes pores/spaces throughout.

It is believed that the coating layer 212 provides cost-effective materials and a cost-effective approach for improving water management under PEM fuel cell conditions. The materials used to form the coating 212 include, but are not limited to, a weak acid and two metal oxide precursors which together form a sol-gel mixture. The weak acid is selected from one of the following acids: sulfonic acid, acetic acid, phosphoric acid, citric acid, boric acid, or other organic acids (e.g., phenyl sulfonic acid (PSA)), and combinations thereof. The metal oxide precursors are selected from precursors of the following metal oxides: silicon dioxide, titanium dioxide, tin dioxide, tantalum oxide, hafnium dioxide, zirconium dioxide, niobium dioxide, molybdenum oxide, iridium oxide, ruthenium oxide, aluminum oxide, or their mixtures. Specific non-limiting examples of suitable metal oxide precursors include (N-(triethoxysilypropyl)urea (TEOSPU) as a precursor for silicon dioxide, and titanium tetraisopropoxide (TTIP) as a precursor for titanium dioxide.

The amount of precursors and acid used may vary depending upon the synthesis processing conditions, materials used, etc. Theoretically, and in one embodiment, the same mole of the acid functional group and the alkoxide functional groups is used to form a perfect (or as close to perfect as possible) metal oxide framework. However, in many instances, the amount of acid may be slight higher than its theoretical number.

At least one of the metal oxide precursors in the sol gel mixture is configured to be hydrolyzed by the weak acid during the process. The weak acid advantageously initializes and contributes to the formation of the mixed metal oxide framework. It is to be understood that the acid functional groups do not chemically attach to the surface of the metal oxide precursor or the resulting mixed metal oxide framework. Rather, the acid functional groups are washed out during the water treatment process. The resulting porous mixed metal oxide framework is believed to increase the hydrophilicity, adhesion, stability, and dispersability of the components of the sol gel coating 212.

In an embodiment, the other of the metal oxide precursors includes an organic functional group. It is believed that such functional groups(s) create better adhesion for the coating layer 212. Non-limiting examples of such organic functional groups include amides, epoxides, acrylates, and alkylureas (such as, in a non-limiting embodiment, propylurea). It is to be understood that these organic functional groups are selected such that they will not and cannot be hydrolyzed during the sol gel process.

In one non-limiting example, the sol gel mixture is generated by mixing a predetermined amount of acetic acid and N-(triethoxysilypropyl)urea in methanol, thereby generating a solution, and adding a predetermined amount of titanium tetraisopropoxide to the solution, thereby forming a titanium dioxide-silicon dioxide sol gel.

Referring now to FIG. 2B, the relatively low cost and simple coating process disclosed herein includes an application step in which the sol gel mixture is applied to the bipolar plate 210 to form a thin film co-gel porous coating 214. The thin film co-gel coating 214 is established to have a thickness on the nano-scale or the micro-scale. Furthermore, the thickness may be varied based upon the fuel cell 100 performance requirements. Any suitable deposition technique may be used to establish the coating, and in one non-limiting example, the technique is a dipping technique.

The application step is followed by the condensation of the thin film co-gel coating 214. Condensation is accomplished via exposure of the coating 214 to air at ambient temperature (e.g., ranging from about 20° C. to about 30° C.) for a predetermined time. The time of condensation will vary, depending, at least in part, upon the metal oxide precursors used. In one non-limiting example, the time is less than or equal to 2 hours. The condensation process may be followed by exposure of the coating 214 to air for a predetermined time at a heated temperature (i.e., any temperature that is higher than the ambient temperature), which, in a non-limiting example, is about 100° C. Again, the exposure time to the elevated temperature will depend upon the materials used.

After the condensation step is completed, the thin film co-gel coating 214 is immersed in water for a predetermined time. During this step, the water may be heated to a temperature of about 80° C. Generally, the water temperature ranges from about 50° C. to about 100° C. This hot water treatment activates the sol gel mixture and creates the porous, hydrophilic, mixed metal oxide sol gel coating 212. The creation of the porous coating 212 also exposes the conductive surface S of the bipolar plate 210. The coating 212 after condensation and water treatment is shown schematically in FIG. 2C.

In order to create hydrophilicity, the thin film co-gel coating 214 (FIG. 2B) is treated by means of the sol gel process and the wet activation process, which includes both the previously described condensation and water treatment. In some instances, it may be desirable that the coating layer 212 is not calcined at a high temperature, which is often used in traditional approaches for porous materials. It has been found that the wet activation process, without calcination, aids in producing porous films 212 with good stability.

In some embodiments, prior to activating the sol gel mixture (i.e., immersing it in water), the fuel cell plate 212 having the coating 214 may be further dried. The additional step of drying, in one example, is accomplished by exposing the coated fuel cell plate 210, 214 to ambient air for a predetermined amount of time, and then exposing the coated fuel cell plate, 210, 214 to a temperature higher than that of the ambient air for another predetermined amount of time. In an embodiment, the higher temperature ranges from about 80° C. to about 200° C., and the ambient temperature is below 80° C.

During PEM fuel cell stack assembly, pressure is normally applied to the coating 212 on the bipolar plate 210 to achieve better conductivity between carbon diffusion paper 218 and the bipolar plates 210 (see FIG. 2D). In terms of the fuel cell 100 of FIG. 1, carbon diffusion papers 218 (not shown in FIG. 1) are utilized within each of the anode layer 112 and cathode layer 114 and respectively contact each of the bipolar plates 110, 210 adjacent to the anode layer 112 and cathode layer 114. Referring back to FIGS. 2C and 2D together, by this means, the gas diffusion layer (e.g., carbon diffusion paper 218) can penetrate through the void space 220 in the mixed metal oxide sol gel coating 212 and get in direct contact with the surface S of the bipolar plates 210, thus providing electronic pathways 222 thereto and therefrom. Conductivity is generated by the operative connection between the carbon diffusion paper 218 and the surface S of the bipolar plates 210.

The electronically conductive paths 222 generated after the wet activation process and during the stack assembly process reduce or eliminate an increase of contact resistance caused by the metal oxide coating layer 212. If the bipolar plate 210 is coated with $SiO_2$, or other metal oxides, the interface tends to become non-conductive. However, the coating 212 described herein greatly improves the interfacial conductivity. Therefore, the embodiments disclosed herein enable the application of a highly hydrophilic coating 212 onto the hydrophobic surface of bipolar metallic plates 210 while maintaining the desired conductivity of the bipolar plates 210.

Prior to the coating process shown in FIGS. 2B through 2D, the surface S of the metal bipolar plate 210 may, in some instances, be pre-treated. In one embodiment, the pre-treatment is accomplished by surface-etching with acid, e.g., $H_2SO_4$, to generate a rough and clean surface. In this embodiment, the plate 210 is dipped into a solution of the acid at room or an elevated temperature for a time suitable to achieve the desired surface treatment. The pre-treated surface is then rinsed with water prior to establishing the sol gel mixture thereon.

In another embodiment, the pre-treatment of the surface S of the metal bipolar plate 210 may be accomplished by partially or completely coating the surface S with another, more conductive, metal, e.g., Pt, Cu, etc. prior to coating the surface S with the sol gel mixture. An electroplating process may be used to apply this conductive metal coating. The electroplating process uses electrical current to reduce cations of a desired material, typically metal, from a solution and to coat a conductive object (e.g., the surface S) with a thin layer of the other material (in this example, a more conductive metal than the metal of the bipolar plate 210). Specifically, an anode formed by an electrically conducting metal, e.g., Pt, Cu, etc. and a cathode formed by the bipolar plate 210 are both connected to an external supply of direct current while both the anode and cathode are immersed in an electrolyte solution. The anode is connected to the positive terminal of the supply and the cathode is connected to the negative terminal. When the external power supply is switched on, the metal at the anode is oxidized from the zero valence state to form cations with a positive charge. These cations associate with the anions in the electrolyte solution. The cations are then reduced at the cathode (i.e., the surface S of the plate 210) to deposit an additional conductive layer in the metallic, zero valence state.

As a non-limiting example of this pretreatment process, if the plating metal is copper, the copper is oxidized in an acid solution at the anode to $Cu^{2+}$ by losing two electrons. The $Cu^{2+}$ anion associates with the anion $SO_4^{2-}$ in the solution to form copper sulfate. At the cathode, the $Cu^{2+}$ is reduced to metallic copper by gaining two electrons. The result is the effective transfer of copper from the anode source to form a metal plating layer covering the surface S of the bipolar plate 210.

To further illustrate embodiment(s) of the present disclosure, various examples are given herein. It is to be understood that these are provided for illustrative purposes and are not to be construed as limiting the scope of the disclosed embodiment(s).

EXAMPLES

Example 1

A $TiO_2$—$SiO_2$ coating (Ti/Si=1:2) was formed and applied on a 304 SS (one type of standardized stainless steel) coupon according to the following description.

2.4 g TEOSPU (N-(triethoxysilypropyl)urea in 50% methanol (United Chemical Tech. Inc.) and 5.0 g acetic acid (99.8% Reagent Plus, Aldrich) were added together with stirring for 10 min at room temperature. 4.4 g TTIP (Titanium tetraisopropoxide, 97%, Aldrich) was added into the above solution with continuous stirring for 30 min at room temperature. The obtained solution was about 11.8 g of TiO2-SiO2 sol gel. The sol gel would become condensed after hours at room temperature.

A bare 304 SS coupon was dipped into the sol gel mixture before it condensed. The coated coupon was then dried at room temperature for 2 hours in air. Then the coated coupon was dried at 100° C. in air overnight. Finally the dried coupon was put in water and kept at 80° C. for at least 4 hours.

Example 2 (Comparative)

A $TiO_2$ coating was formed and applied on a 304 SS coupon according to the following description.

7.1 g TTIP (Titanium tetraisopropoxide, 97%, Aldrich) and 6.0 g acetic acid (99.8% Reagent Plus, Aldrich) were added together with stirring for 30 min at room temperature. The obtained solution was about 11.8 g of TiO2 sol gel. The sol gel could become condensed after hours at room temperature.

A bare 304 SS coupon was then dipped into the sol gel before it condensed. The coated coupon was then dried at room temperature for 2 hours in air. Then the coated coupon was dried at 100° C. in air overnight. Finally the dried coupon was put in water and kept at 80° C. for at least 4 hours.

Example 3 (Comparative)

An $SiO_2$ coating was formed and applied on a 304 SS coupon according to the following description.

7.4 g TEOSPU (N-(triethoxysilypropyl) urea in 50% methanol (United Chemical Tech. Inc.) and 4.5 g acetic acid (99.8% Reagent Plus, Aldrich) were added together with stirring for 30 min at room temperature.

A bare 304 SS coupon was then dipped into the sol gel before it condensed. The coated coupon was then dried at room temperature for 2 hours in air. Then the coated coupon was dried at 100° C. in air overnight.

Finally the dried coupon was put in water and kept at 80° C. for at least 4 hours.

Example 4

Coupons were prepared based on the procedures described in Example 1 and Comparative Examples 2 and 3. Specifically, various coupons were prepared with the following mol ratios of Ti/Si: 1:1, 1:2, 1:4, 1:8, 1:0 and 0:1. Hydrophilicity data was obtained based on the diameter of a 10 μl water drop. A drop is said to be hydrophilic when the drop spreads into the whole surface of the coupon (1 sq. in). Conductivity data was also obtained based on contact resistance, which was measured under a fixed current density under various pressures.

After all of the coated coupons (except Ti/Si=1:8) were dried at 100° C. overnight, all the $TiO_2$-containing coatings were hydrophilic. The $SiO_2$ coating (Ti/Si=0:1) is hydrophobic after it is dried. It was observed that the $SiO_2$ solution could not be condensed, which implies that acetic acid could not hydrolyze the $SiO_2$ precursor, TEOSPU. On the other hand, apparently, all of the $TiO_2$-$SiO_2$ sol gels were hydrolyzed by acetic acid because of the presence of the titanium precursor (TTIP).

Table 1 summarizes the findings from the samples including both $TiO_2$ and $SiO_2$ described above.

TABLE 1

Summary of $TiO_2$—$SiO_2$ Coated 304 SS Coupons

| Coupon | Ti/Si (mol) | Hydrophilic after Dried? | Hydrophilic after Water Treated? | Conductive |
|---|---|---|---|---|
| 1 | 1:1 | Yes | Yes | Yes |
| 2 | 1:2 | Yes | Yes | Yes |
| 3 | 1:4 | Yes | Yes | Yes |
| 4 | 1:8 | No | Yes | Yes |
| 5 | 1:0 | Yes | Yes | N/A |
| 6 | 0:1 | No | No | N/A |

The coatings on the coupons were dried according to the procedure of drying at 100° C. overnight in air. The coatings on the coupons were water-treated according to the procedure of putting them in water at 80° C. overnight after they were dried. Conductivity was unable to be measured for the 1:0 and 0:1 Ti/S coupons because of cracks and aggregation.

Figure 4A:
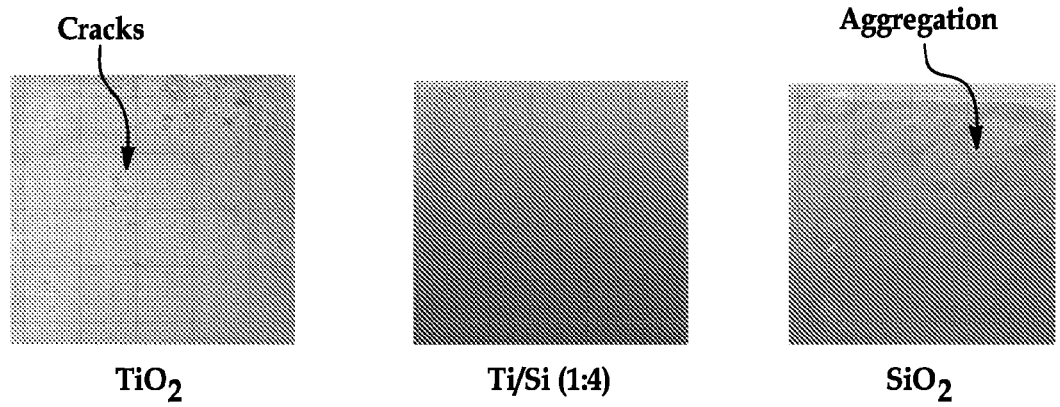
FIGS. 4A and 4B together depict four photographs showing comparative results from a coating uniformity and a water hydrophilicity test, where
Figure 4B:
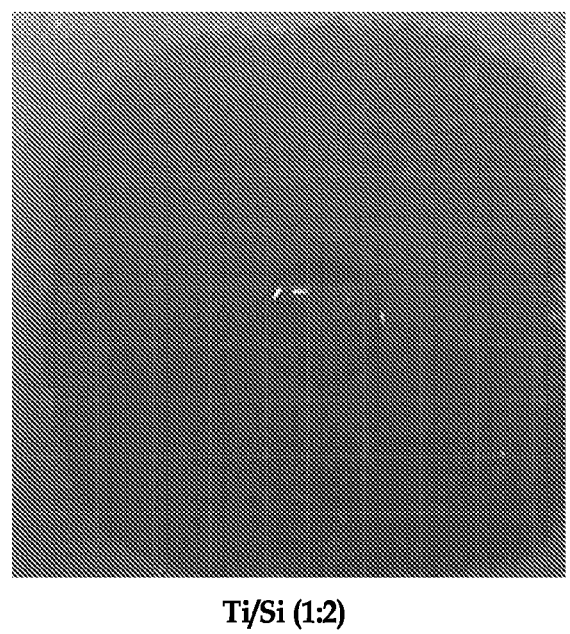

Coating uniformity and water hydrophilicity were tested in the coupons made as described above. As shown in FIGS. 4A and 4B, mixed $TiO_2$—$SiO_2$ coatings have better quality and uniformity (See FIG. 4(A) Ti/Si (1:4)). In comparison, as shown in FIG. 4A, in coupons with either but not both of $TiO_2$ or $SiO_2$, the coatings lack some of these desirable qualities. After the $TiO_2$ coating was dried overnight at 100° C., the coating showed poorer adhesion and tended to flake off from the surface of the coupon, as shown in FIG. 4A. In the case of the $SiO_2$ coating, after drying the coating overnight at 100° C., the coating showed better adhesion, but was not uniform, also as shown in FIG. 4A. In FIG. 4B, the Ti/Si (1:2) coating is shown on which a hydrophilicity test was performed. This test was performed by placing a water drop of 10 μl on the dried coating having a Ti/Si ratio of 1:2. FIG. 4B illustrates that the coating layer had high hydrophilicity, because the water drop spread evenly throughout the surface of the coating, a characteristic which is indicative of hydrophilicity.

Example 5

Figure 5:
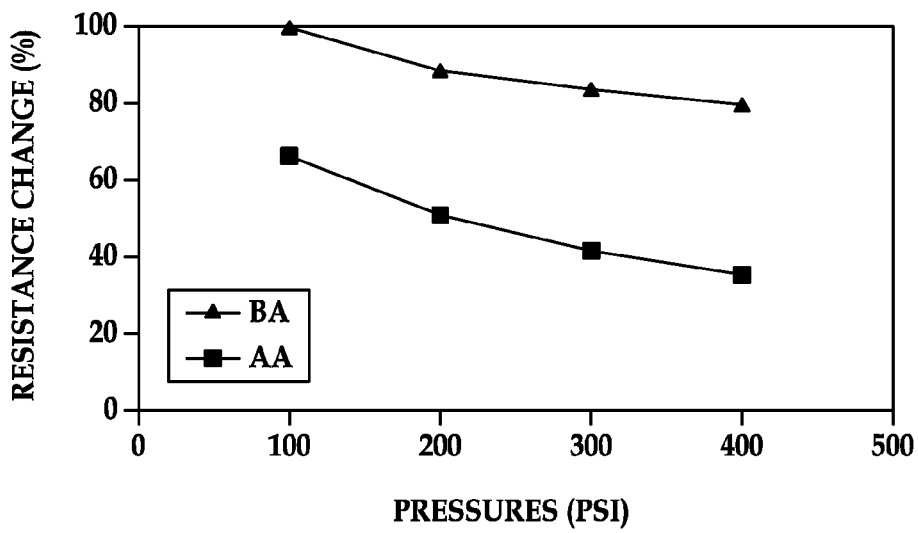
FIG. 5 is a graph comparing the decrease in normalized contact resistance change (%) under increasing pressure (psi) of an embodiment of the coating disclosed herein, where BA reflects the results before activation and AA reflects the results after activation.

For the coupon of $TiO_2$—$SiO_2$ (T/Si=1:2), as described above, the coated coupon had been first dried (i.e., before activation, BA) and then water treated (i.e., after activation, AA). Comparative data relating to the percentage of contact resistance change for the BA sample and AA sample is shown in FIG. 5. The data was obtained by comparing the AA resistance to the BA resistance for the coupon at 100 psi. The results show the contact resistance difference with an increase of pressure. Clearly, resistance was drastically reduced after the sample was treated in water.

As part of the experiment, the mixed metal oxide conductivity was tested with the coated coupons being placed between two carbon papers. It was found that the mixed metal oxide was non-conductive. This suggests that the conductivity is be generated by the connection of the carbon paper and the bare coupon surface as described above.

While several embodiments have been described in detail, it will be apparent to those skilled in the art that the disclosed embodiments may be modified. Therefore, the foregoing description is to be considered exemplary rather than limiting.

The invention claimed is:

1. A method of coating a surface of a fuel cell plate, the method comprising:
    forming a sol gel mixture by mixing a weak acid and a composition including at least two metal oxide precursors, one of the metal oxide precursors configured to be hydrolyzed by the weak acid to form a mixed metal oxide framework with an other of the metal oxide precursors having at least one organic functional group that is not hydrolyzed by the weak acid;
    applying the sol gel mixture to the surface of the fuel cell plate;
    condensing the sol gel mixture by exposure to air at at least one predetermined temperature for a predetermined time; and
    immersing the sol gel mixture in water at a predetermined temperature for a predetermined time to form a porous, hydrophilic, and conductive film on the surface of the fuel cell plate.

2. The method as defined in claim 1 wherein the at least one organic functional group is selected from the group consisting of amides, acrylics, epoxides, alkylureas and combinations thereof.

3. The method as defined in claim 1, further comprising pretreating the surface of the fuel cell plate via a surface etching process, an electroplating process, or a combination thereof.

4. The method as defined in claim 1 wherein the at least two metal oxide precursors are selected from the group consisting of precursors of: silicon dioxide, titanium dioxide, tin dioxide, tantalum oxide, hafnium dioxide, zirconium dioxide, niobium dioxide, molybdenum oxide, iridium oxide, ruthenium oxide, and aluminum oxide.

5. The method as defined in claim 1 wherein the weak acid is selected from the group consisting of acetic acid, phosphoric acid, citric acid, boric acid, and combinations thereof.

6. The method as defined in claim 1 wherein the weak acid is acetic acid, wherein the other of the metal oxide precursors having the at least one organic functional group is N-(triethoxysilypropyl)urea, wherein the one of the metal oxide precursors configured to be hydrolyzed by the weak acid is titanium tetraisopropoxide, and wherein the sol gel mixture is accomplished by:
    mixing a predetermined amount of acetic acid and N-(triethoxysilypropyl)urea in methanol, thereby generating a solution; and adding a predetermined amount of titanium tetraisopropoxide to the solution, thereby forming a titanium dioxide-silicon dioxide sol gel mixture.

7. The method as defined in claim 1 wherein immersing activates the sol gel mixture, and wherein prior to immersing, the method further comprises drying the fuel cell plate having the suspension applied thereto.

8. The method as defined in claim 7 wherein drying the fuel cell plate having the sol gel mixture applied thereto is accomplished by:
  exposing the fuel cell plate to ambient air for a predetermined amount of time; and
  thereafter exposing the fuel cell plate to a temperature higher than that of the ambient air for an other predetermined amount of time.

9. The method as defined in claim 8 wherein the higher temperature that the fuel cell plate is exposed to ranges from about 80° C. to about 200° C.

10. The method as defined in claim 8 wherein the predetermined temperature of the water ranges from about 50° C. to about 100° C.

* * * * *